UNITED STATES PATENT OFFICE.

GEORGE W. SWETT, OF TROY, NEW YORK.

IMPROVEMENT IN MELTING AND TREATING IRON AND STEEL RAILS AND SCRAP.

Specification forming part of Letters Patent No. 203,957, dated May 21, 1878; application filed May 28, 1877.

*To all whom it may concern:*

Be it known that I, GEORGE W. SWETT, of the city of Troy, county of Rensselaer and State of New York, have invented a new and Improved Process for Melting and Treating Bessemer Iron or Bessemer Steel Rails, Scrap-Steel, or Old Iron Rails, of which the following is a specification:

The nature of my invention consists of a process for melting old rails, Bessemer steel, and wrought-iron, by adding such metals, or either of them, to a mass of melted iron contained in a converting vessel, and while the latter is at the high heat produced by an entering decarbonizing current of air; after the addition of the metals, or either of them, to the molten mass, then to substitute for the current of air entering the converting vessel a compound of air and pulverulent fuel, mechanically mixed and carried in by the blast, or a mixture of air and hydrocarbon gases, to recarbonize the mass, and thus facilitate the melting of the added metal. After the latter is melted, then the action of the carbonizing-blast is changed to one producing decarbonization by means of a blast of air alone; and when decarbonization is completed, spiegeleisen or franklinite is added in the usual manner.

My invention also consists, separately considered, in adding to metal, while in a state of fusion, and in a converting vessel, a mixture of atmospheric air and powdered fuel or hydrocarbon gases, to heat the same and to carbonize the metal, the air and fuel being carried into and through the melted metal by means of a blast.

My process consists in placing in a Bessemer converter, or other suitable receiver of the same character, a mass of melted iron, to serve the purpose of a solvent bath or melting-menstrum. Through this mass I inject a blast of air, either heated or cold, in the same manner as is done in the Bessemer process. While this metal is in a highly-heated condition from the combustion of the carbon by means of atmospheric oxygen, I add old rails, in pieces, which may be charged into the converter either heated or cold, although I prefer to add them in a heated condition. When this latter material has been added to the metal in the converter in such proportion as not to chill the mass in the converter too much, then and thereupon, instead of the blast of atmospheric air, before described, I send into, through, or over the mass of metal, pulverulent fuel or hydrocarbon gases, or both, mixed with air to again carbonize the mass, so that the added Bessemer iron may be carbonized and melted. This addition of carbon again raises the heat and causes the Bessemer iron to take up sufficient carbon to melt. After the mass has become homogeneous and the added Bessemer iron melted, I then decarbonize the same by a simple blast of air, in the same manner as is accomplished in the Bessemer process, and subsequently add the spiegeleisen in the same manner. At this stage the mass may be in part drawn off and more old metal added, as before; or the contents of the converter may be run off into ingots.

I am well aware that there is no novelty in passing a current of air through a mass of melted metal contained in a converting vessel, and the difference between this well-known method and my invention consists in the fact that the former is but one of a series of operations, and connected with other stages in my process; that, while I use the same, I use it in combination and connection with other subsequent conditions of treatment.

The object sought to be acomplished is to combine, by a series of steps in treatment, the ordinary means applied with the Bessemer process and other additional means, so as to melt wrought-iron rails, Bessemer rails, scrap-steel, &c., by the great heat produced in the molten metal, both under the influence of a decarbonizing-flame and in immediate sequence, to continue the heat with a carbonizing-flame until the added steel or iron is melted, and then to follow this by its subsequent decarbonization and the addition of spiegeleisen, and thus melt and reconvert the metal.

Having thus described my invention, what I claim, and desire to secure by Letters Patent, is—

The process herein described for melting Bessemer metal or wrought-iron, which consists in adding the same to a bath of molten iron kept at a high temperature in the converter by means of the air-blast, then injecting pulverulent carbonaceous matter or hydrocarbon gases into the mass by means of the blast, whereby sufficient carbon is supplied thereto to recarbonize the entire mass, then redecarbonizing the same by passing into it the air-blast alone, and finally adding spiegeleisen or franklinite, substantially as described.

Signed at Troy, New York, this 24th day of May, 1877.

GEO. W. SWETT.

Witnesses:
GILES KELLOGG,
GILES B. KELLOGG.